3,335,166
EXO-CYANOBICYCLO[2.2.1]HEPTANES AND
METHOD OF PREPARATION
Harry A. Stansbury, Jr., South Charleston, and Glenn A. Carte, Sr., Charleston, W. Va., assignors to Union Carbide Corporation, a corporation of New York
No Drawing. Filed Sept. 23, 1964, Ser. No. 398,761
12 Claims. (Cl. 260—464)

This invention relates to novel exo-cyanobicyclo[2.2.1] heptanes, and to a method for their prepartion from sulfenyl halides and exo-cyanobicyclo[2.2.1]heptenes. In a particular aspect, this invention is concerned with novel 5(or 6)-halo-6(or 5)-aryl (or alkyl)-thiobicyclo[2.2.1] hept-2-yl-exo-carbonitriles, and to a method for their preparation from sulfenyl halides and bicyclo[2.2.1] hept-5-en-2-yl-exo-carbonitriles.

In general, the addition of sulfenyl halides to bridged bicyclic olefins is a known reaction; and the addition of p-toluenesulfenyl chloride to norborene has been reported in the literature, J. Am. Chem. Soc., 79, 6035 (1957). But to the best of our knowledge and belief, the neucleophilic addition of sulfenyl halides to exo-cyanobicyclo [2.2.1]heptenes, such as the addition of sulfenyl halides to bicyclo[2.2.1]hept-5-en-2-yl-exo-carbonitriles, is novel.

Accordingly, an object of the present invention is to provide novel exo-cyanobicyclo[2.2.1]heptanes. Another object is to provide novel 5(or 6)-halo-6(or 5)-aryl (or alkyl)-thiobicyclo[2.2.1]hept-2-yl-exo-carbonitriles. A still further object is to provide novel 5(or 6)-halo-6(or 5)- (haloarylthio) bicyclo[2.2.1]heptan - 2 - yl-exo-carbonitriles. Another object is to provide novel 5(or 6)-halo-6 (or 5) - haloalkylthio)-bicyclo[2.2.1]heptan-2-yl-exo-carbonitriles. Another object is to provide a novel method for the preparation of exo-cyanobicyclo[2.2.1]heptanes from sulfenyl halides and exo-cyanobicyclo[2.2.1] heptenes. A still further object is to provide a novel method for the preparation of 5(or 6)-halo-6(or 5)-aryl (or alkyl) thiobicyclo[2.2.1]hept - 2 - yl-exo-carbonitriles from sulfenyl halides and bicyclo[2.2.1]hept-5-en-2-yl-exo-carbonitriles. These and other objects of this invention will become apparent to those skilled in the art to which this invention pertains from the ensuing description thereof.

The 5(or 6)-halo-6(or 5)-aryl (or alkyl) thiobicyclo [2.2.1]hept-2-yl-exo-carbonitriles of this invention can be represented by Formula I:

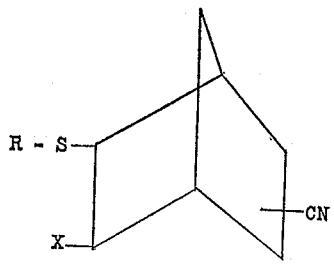

wherein R is either alkyl, haloalkyl, arylalkyl, aryl, haloaryl, alkoxyaryl, alkylthioaryl, arylthioaryl, alkoxycarbonylalkyl, nitroaryl, halonitroaryl, or alkaryl groups; and X is halogen. Preferably, R is alkyl having from 1 to 18 carbon atoms; haloalkyl having from 1 to 4 halo atoms, and from 1 to 18 alkyl carbon atoms, arylalkyl having either 6 or 10 aryl carbon atoms, and from 1 to 18 alkyl carbon atoms; aryl having either 6 or 10 carbon atoms; haloaryl having from 1 to 5 halo atoms, and either 6 or 10 aryl carbon atoms; alkoxyaryl having from 1 to 5 alkoxy groups, with from 1 to 5 alkyl carbon atoms in each alkoxy group, and either 6 or 10 aryl carbon atoms; alkylthioaryl having from 1 to 5 alkylthio groups, with from 1 to 5 alkyl carbon atoms in each alkylthio group, and either 6 or 10 aryl carbon atoms; arylthioaryl having either 6 or 10 carbon atoms in each aryl group; nitroaryl having from 1 to 5 nitro groups, and 6 to 10 aryl carbon atoms; halonitroaryl having from 1 to 5 halo atoms, from 1 to 5 nitro groups, and either 6 or 10 aryl carbon atoms; alkaryl having from 1 to 5 alkyl carbon atoms, and either 6 or 10 aryl carbon atoms; and X is chlorine, bromine or iodine.

The most preferred 5(or 6)-halo-6(or 5)-aryl (or alkyl) thiobicyclo[2.2.1]hept - 2-yl-exo-carbonitriles represented by Formula I are those wherein R is alkyl of from 1 to 8 carbon atoms; chloroalkyl having from 1 to 4 carbon atoms, and from 1 to 8 alkyl carbon atoms; phenylalkyl having from 1 to 8 alkyl carbon atoms; phenyl; chlorophenyl having from 1 to 5 chloro atoms; nitrophenyl having from 1 to 5 nitro groups; alkoxyphenyl having from 1 to 5 alkoxy groups with from 1 to 5 carbon atoms in each alkoxy group; alkylthiophenyl having from 1 to 5 alkylthio groups with from 1 to 5 carbon atoms in each alkylthio group; phenylthiophenyl; nitrophenyl having from 1 to 5 nitro groups; chloronitrophenyl having from 1 to 5 chloro atoms or from 1 to 5 nitro groups; alkylphenyl having from 1 to 8 alkyl carbon atoms; and X is chlorine.

The most highly preferred 5(or 6)-halo-6(or 5)-aryl (or alkyl) thiobicyclo[2.2.1]hept-2-yl-exo-carbonitriles of this invention are the 5(or 6)-chloro-6(or 5) aryl (or alkyl) thiobicyclo[2.2.1]hept-2-yl-exo-carbonitriles which can be represented by Formula II:

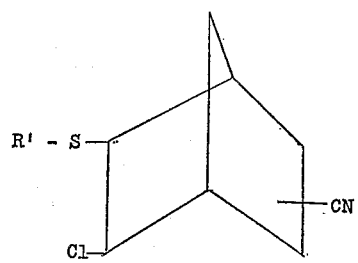

wherein R' is phenyl, chlorophenyl and bromophenyl with from 1 to 5 chlorine or bromine atoms; nitrophenyl, with from 1 to 5 nitro groups; alkylphenyl, alkyl, chloroalkyl and bromoalkyl of from 1 to 5 alkyl carbon atoms, with from 1 to 3 chlorine or bromine atoms and alkoxy of from 1 to 5 alkyl carbon atoms.

Briefly, the exo-cyanobicyclo[2.2.1]heptanes encompassed within this invention can be prepared merely by the neucleophilic addition of sulfenyl halides to exo-cyanobicyclo[2.2.1]heptenes. In particular, the exo-cyanobicyclo[2.2.1]heptanes of this invention are prepared by the neucleophilic addition of bicyclo[2.2.1]hept-5-en-2- yl-exo-carbonitriles with sulfenyl halides according to reaction scheme (A):

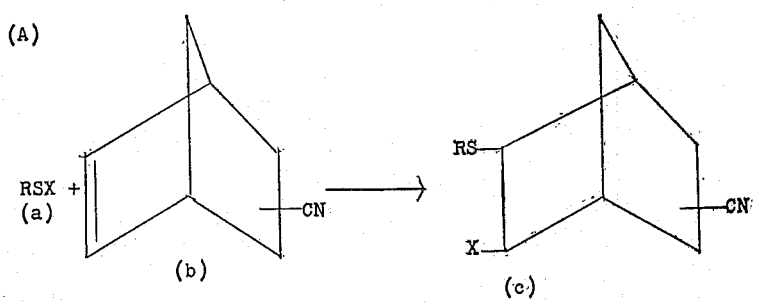

wherein a sulfenyl halide (a) reacts with a bicyclo[2.2.1]hept-5-en-2-yl-exo-carbonitrile (b) to provide the desired 5(or 6) halo-6(or 5)-aryl-(or alkyl) thiobicyclo[2.2.1]hept-2-yl-exo-carbonitrile (c).

With reference to reaction scheme (A), R and X have the aforementioned meanings with reference to Formulae I or II, supra. The sulfenyl halides (a) are either prepared from commercially available mercaptans or disulfides and a halogen or, if not commercially available, are prepared by reduction of the corresponding arylsulfonyl halide or by reaction of the necessary alkyl halide and thiourea with subsequent hydrolysis. Methods for the preparation of the sulfenyl halides are known in the art such as those methods disclosed in Ber., 51, 755 (1918), and J. Am. Chem. Soc. 73, 2109 (1951). The bicyclo[2.2.1]hept-5-en-2-yl-exo-carbonitriles (b) can be prepared by known methods such as that disclosed in J. Am. Chem. Soc. 64, 2457 (1942).

Representative sulfenyl halides used to prepare the exo-cyanobicyclo[2.2.1]heptanes of this invention include, for example, benzenesulfenyl chloride, benzenesulfenyl bromide, 4-chlorobenzenesulfenyl chloride, p-toluenesulfenyl chloride, o-nitrobenzenesulfenyl chloride, and the like. Additional sulfenyl halides represented by their structures are to be found in Table I, infra.

The following example will specifically illustrate the preparation of a sulfenyl halide employed to prepare the exo-cyanobicyclo[2.2.1]heptanes of this invention.

EXAMPLE 1

*Phenylsulfenyl chloride*

Diphenylsulfide (22 g., 0.1 mole) in 500 ml. carbon tetrachloride was treated with chlorine (8 g., 0.113 mole) and stirring at 25–30° C. for 2½ hours. The reaction mixture was distilled under reduced pressure to obtain 26 g. (90.3% yield) of phenylsulfenyl chloride, B.P. 60° C./3. mm.

*Analysis.*—Calc'd for $C_6H_5SCl$: Cl, 24.30; S, 22.22. Found: Cl, 26.89; S, 25.11.

Other sulfenyl chlorides employed in this invention such as those illustrated by structure in Table I, infra, can be prepared by a similar procedure.

The following examples will more fully specifically illustrate the exo-cyanobicyclo[2.2.1]heptanes of this invention.

EXAMPLE 2

*5(6)-chloro-6(5)-(4-chlorophenylthio)bicyclo[2.2.1]heptan-2-yl-exo-carbonitrile*

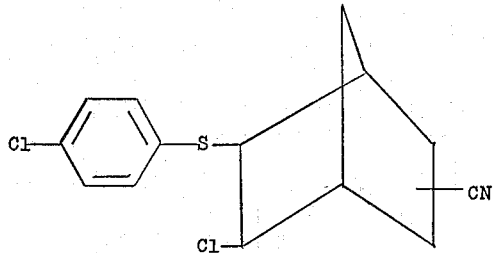

Bicyclo[2.2.1]hept-2-yl-exo-carbonitrile (11.9 g. 0.1 mole) in 50 ml. anhydrous ethyl ether solvent was treated dropwise with 4-chlorobenzenesulfenyl chloride (17.9 g., 0.1 mole) at 0–10° C. The solution was allowed to warm to room temperature and then stripped under reduced pressure to obtain 29 g. (97% yield) of residue product of 5(6)-chloro-6(5)-(4-chlorophenylthio)bicyclo[2.2.1]heptan-2-yl-exo-carbonitrile.

*Analysis.*—Calc'd for $C_{14}H_{13}Cl_2NS$: C, 56.7; H, 4.37; N, 4.70; S, 10.7; Cl, 23.8. Found: C, 55.0; H, 4.47; N, 4.82; S, 9.95; Cl, 21.64.

Additional examples of exo-cyanobicyclo[2.2.1]heptanes encompassed within this invention are illustrated in Table I.

TABLE I.—EXO-CYANOBICYCLO[2.2.1]HEPTANES

| Ex. | Structure of Sulfenyl halide reacted with bicyclo[2.2.1]hept-5-en-2-yl-exo-carbonitrile* | Name of Product | $n_D^{30}$ | Anal. Calc. | | | Found | | |
|---|---|---|---|---|---|---|---|---|---|
| | | | | C | H | Cl | C | H | Cl |
| 3 | $C_2H_5O\overset{O}{\overset{\|}{C}}CH_2SCl$ | 5(6)-chloro-6(5)-ethoxy-carbonyl-methylthio-bicyclo[2.2.1]hept-2-yl-exo-carbonitrile. | 1.5174 | 52.6 | 5.9 | 12.9 | 52.7 | 5.8 | 13.0 |
| 4 | $CH_3SCl$ | 5(6)-chloro-6(5)-methylthio-bicyclo[2.2.1]hept-2-yl-exo-carbonitrile. | 1.5349 B.P. 127°/1 mm. | 53.6 | 6.0 | 17.6 | 53.9 | 5.9 | 17.4 |
| 5 | $n-C_4H_9SCl$ | 5(6)-chloro-6(5)-butylthio-bicyclo[2.2.1]hept-2-yl-exo-carbonitrile. | 1.5159 | 59.1 | 7.4 | 14.5 | 59.8 | 7.3 | 14.1 |
| 6 | $n-C_{12}H_{25}SCl$ | 5(6)-chloro-6(5)-dodecylthio-bicyclo[2.2.1]hept-2-yl-exo-carbonitrile. | 1.4943 | 67.5 | 9.6 | 10.0 | 68.4 | 9.6 | 9.0 |
| 7 | $Cl_3CSCl$ | 5(6)-chloro-6(5)-tri-chloro-methylthiobicyclo[2.2.1]hept-2-yl-exo-carbonitrile. | 1.5888 B.P. 187–195°/3mm. | 35.4 | 3.0 | 46.5 | 36.5 | 3.2 | 44.0 |
| 8 | $ClCH_2CH_2SCl$ | 5(6)-chloro-6(5)-(2-chloro-ethylthio)bicyclo[2.2.1]hept-2-yl-exo-carbonitrile. | 1.5458 | 48.0 | 5.2 | 28.3 | 48.5 | 5.4 | 28.0 |

TABLE I.—EXO-CYANOBICYCLO[2.2.1]HEPTANES—Continued

| Ex. | Structure of Sulfenyl halide reacted with bicyclo[2.2.1]hept-5-en-2-yl-exo-carbonitrile* | Name of Product | $n_D^{30}$ | Anal. Calc. C | Anal. Calc. H | Anal. Calc. Cl | Found C | Found H | Found Cl |
|---|---|---|---|---|---|---|---|---|---|
| 9 | Cl₃CCHSCl (with Cl on CH) | 5(6)-chloro-6(5)-(1,2,2,2-tetrachloroethylthio)bicyclo[2.2.1]hept-2-yl-exo-carbonitrile. | | 34.0 | 2.8 | 50.3 | 28.2 | 2.2 | 56.0 |
| 10 | C₆H₅—CH₂SCl | 5(6)-chloro-6(5)-benzylthiobicyclo[2.2.1]hept-2-yl-exo-carbonitrile. | 1.5728 | 64.9 | 5.8 | 12.8 | 64.4 | 5.8 | 12.6 |
| 11 | Cl—C₆H₄—CH₂—SCl | 5(6)-chloro-6(5)-(4-chlorobenzylthio)bicyclo[2.2.1]hept-2-yl-exo-carbonitrile. | 1.5788 | 57.7 | 4.8 | 22.7 | 57.1 | 5.0 | 22.6 |
| 12 | C₆H₅—SCl | 5(6)-chloro-6(5)-phenylthiobicyclo[2.2.1]hept-2-yl-exo-carbonitrile. | | 63.8 | 5.3 | 5.3% N | 64.5 | 5.2 | 5.1% N |
| 13 | CH₃—C₆H₄—SCl | 5(6)-chloro-6(5)-(4-methylphenylthio)bicyclo[2.2.1]hept-2-yl-exo-carbonitrile. | B.P. 206–210°/2.5 mm. | 64.9 | 5.8 | 12.8 | 64.3 | 5.4 | 13.9 |
| 14 | C₆H₄(3-CH₃)—SCl | 5(6)-chloro-6(5)-(3-methylphenylthio)bicyclo[2.2.1]-hept-2-yl-exo-carbonitrile. | 1.5732 | 64.9 | 5.8 | 12.8 | 65.3 | 5.9 | 12.0 |
| 15 | C₆H₄(2-CH₃)—SCl | 5(6)-chloro-6(5)-(2-methylphenylthio)bicyclo[2.2.1]hept-2-yl-exo-carbonitrile. | 1.5788 | 64.9 | 5.8 | 12.8 | 65.5 | 5.8 | 11.8 |
| 16 | NO₂—C₆H₄—SCl | 5(6)-chloro-6(5)-(4-nitrophenylthio)bicyclo[2.2.1]hept-2-yl-exo-carbonitrile. | M.P. 93–99°. | 54.6 | 4.2 | 11.5 | 54.6 | 4.3 | 10.8 |
| 17 | C₆H₄(3-NO₂)—SCl | 5(6)-chloro-6(5)-(3-nitrophenylthio)bicyclo[2.2.1]hept-2-yl-exo-carbonitrile. | | 54.5 | 4.2 | 11.5 | 54.6 | 4.4 | 11.5 |
| 18 | C₆H₄(2-NO₂)—SCl | 5(6)-chloro-6(5)-(2-nitrophenylthio)bicyclo[2.2.1]hept-2-yl-exo-carbonitrile. | M.P. 148–155°. | 54.5 | 4.2 | 11.5 | 54.5 | 4.4 | 11.5 |
| 19 | Cl—C₆H₃(NO₂)—SCl | 5(6)-chloro-6(5)-(4-chloro-2-nitrophenylthio)bicyclo[2.2.1]hept-2-yl-exo-carbonitrile. | M.P. 168–180°. | 49.0 | 3.5 | 20.7 | 49.0 | 3.6 | 20.4 |
| 20 | Cl—C₆H₄—SBr | 5(6)-bromo-6(5)-(4-chlorophenylthio)bicyclo[2.2.1]hept-2-yl-exo-carbonitrile. | | 49.1 | 3.8 | (Cl+Br) (33.7) | 52.5 | 3.7 | (Cl+Br) (31.5) |
| 21 | Br—C₆H₄—SCl | 5(6)-chloro-6(5)-(4-bromophenylthio)bicyclo[2.2.1]hept-2-yl-exo-carbonitrile. | | 49.1 | 3.8 | (Cl+Br) (33.7) | 46.9 | 3.6 | (Cl+Br) (34.2) |
| 22 | Cl—C₆H₃(Cl)—SCl (3,4-) | 5(6)-chloro-6(5)-(3,4-dichlorophenylthio)bicyclo[2.2.1]hept-2-yl-exo-carbonitrile. | | 50.5 | 3.6 | 32.1 | 47.4 | 3.3 | 29.0 |
| 23 | Cl—C₆H₃(Cl)—SCl (2,5-) | 5(6)-chloro-6(5)-(2,5-dichlorophenylthio)bicyclo[2.2.1]hept-2-yl-exo-carbonitrile. | | 50.5 | 3.6 | 32.1 | 49.8 | 3.4 | 32.5 |
| 24 | Cl—C₆H₃(Cl)—SCl (2,4-) | 5(6)-chloro-6(5)-(2,4-dichlorophenylthio)bicyclo[2.2.1]hept-2-yl-exo-carbonitrile. | M.P. 143–145° | 50.5 50.5 | 3.6 3.6 | 32.1 32.1 | 50.0 49.8 | 3.6 3.5 | 31.2 31.1 |
| 25 | Cl—C₆H₂(Cl)(Cl)—SCl (2,4,5-) | 5(6)-chloro-6(5)-(2,4,5-trichlorophenylthio)bicyclo[2.2.1]hept-2-yl-exo-carbonitrile. | M.P. 116–120°  M.P. 135–140° | 45.8 45.8 45.8 | 3.0 3.0 3.0 | 38.7 38.7 38.7 | 48.6 46.0 46.3 | 2.9 3.0 2.8 | 36.8 32.8 34.7 |

TABLE I.—EXO-CYANOBICYCLO[2.2.1]HEPTANES—Continued

| Ex. | Structure of Sulfenyl halide reacted with bicyclo[2.2.1]hept-5-en-2-yl-exo-carbonitrile* | Name of Product | $n_D^{30}$ | Anal. Calc. C | Anal. Calc. H | Anal. Calc. Cl | Found C | Found H | Found Cl |
|---|---|---|---|---|---|---|---|---|---|
| 26 | Cl-C6Cl4-SCl (pentachlorophenyl) | 5(6)-chloro-6(5)-(pentachlorophenylthio)bicyclo[2.2.1]hept-2-yl-exo-carbonitrile. | | 38.5 | 2.1 | 48.9 | 39.5 | 2.2 | 46.6 |
| 27 | CH3O-C6H4-SCl | 5(6)-chloro-6(5)-(4-methoxyphenylthio)bicyclo[2.2.1]hept-2-yl-exo-carbonitrile. | | 61.4 | 5.4 | 12.1 | 57.1 | 5.2 | 14.1 |
| 28 | CH3S-C6H4-SCl | 5(6)-chloro-6(5)-[4-(methylthio)phenylthio]hept-2-yl-exo-carbonitrile. | | 58.2 | 5.2 | 11.5 | 52.2 | 4.4 | 13.7 |
| 29 | Cl-C6H4-S-C6H4-SCl | 5(6)-chloro-6(5)-[4-(4-chlorophenylthio)phenylthio]hept-2-yl-exo-carbonitrile. | | 59.2 | 4.2 | 17.5 | 60.2 | 4.3 | 17.1 |
| 30 | naphthyl-SCl | 5(6)-chloro-6(5)-(2-naphthylthio)bicyclo[2.2.1]hept-2-yl-exo-carbonitrile. | 1.6345 | 68.9 | 5.1 | 11.3 | 68.0 | 5.1 | 11.4 |
| 31 | Cl-C6H4-SCl | 5(6)-chloro-6(5)-(4-chlorophenylthio)bicyclo[2.2.1]hept-2-yl-exo-carbonitrile. | | 56.7 | 4.4 | 23.8 | 55.0 | 4.5 | 21.6 |

Other exo-cyanobicyclo[2.2.1]heptane derivatives encompassed within this invention which can be prepared in a manner similar to those shown in the aforementioned examples include, among others, 5(6)-iodo-6(5)-ethylthiobicyclo[2.2.1]hept-2-yl-exo-carbonitrile, 5(6) - bromo - 6(5)-(2-nitrophenylthio)bicyclo[2.2.1]hept-2-yl - exo - carbonitrile, 5(6) - bromo - 6(5)-(4-bromo-2-bromophenylthio)bicyclo[2.2.1]hept-2-yl-exo-carbonitrile, 5(6) - bromo - 6(5) - (1,2,2,2 - tetrabromoethylthio)bicyclo[2.2.1]hept - 2-yl-exo-carbonitrile, 5(6)-bromo-6(5)-(4-bromobenzylthio)bicyclo[2.2.1]hept-2-yl-exo-carbonitrile, 5(6)-bromo - 6(5)-tribromomethylthiobicyclo[2.2.1]hept-2-yl-exo-carbonitrile, 5(6) - fluoro - 6(5) - phenylthiobicyclo[2.2.1]hept-2-yl-exo-carbonitrile, and the like.

The exo-cyanobicyclo[2.2.1]heptane derivatives of this invention have been shown to possess pesticidal activity. In particular, they show insecticidal activity against mites, especially mite eggs, and army worms. They show activity both as residue products and as fractionally crystallized products.

Table II indicates pesticidal activity of the exo-cyanobicyclo[2.2.1]heptanes of this invention.

TABLE II.—PESTICIDAL ACTIVITY OF EXO-CYANOBICYCLO[2.2.1]HEPTANES

Compound name: Type of activity

- 5(6) - chloro - 6(5) - butylthiobicyclo[2.2.1]hept - 2 - yl - exo-carbonitrile _____ Nematocide.
- 5(6) - chloro - 6(5) - trichloromethylthiobicyclo[2.2.1]hept - 2-yl-exo-carbonitrile _____ Soil fungicide.
- 5(6) - chloro-6(5)-(1,2,2,2-tetrachloroethylthio)bicyclo[2.2.1]hept-2-yl-exo-carbonitrile _____ Bactericide and fungicide.
- 5(6) - chloro - 6(5) - benzylthiobicyclo[2.2.1]hept - 2 - yl-carbonitrile _____ Fungicide.
- 5(6) - chloro - 6(5) - (4 - chlorobenzylthio) - bicyclo[2.2.1]hept-2-yl-exo-carbonitrile _____ Acaricide.

TABLE II—Continued

- 5(6) - chloro - 6(5) - (2 - methylphenylthio) - bicyclo[2.2.1]hept-2-yl-exo-carbonitrile _____ Nematocide.
- 5(6) - chloro - 6(5) - (4 - bromophenylthio) - bicyclo[2.2.1]hept-2-yl-exo-carbonitrile _____ Acaricide.
- 5(6) - chloro - 6(5)-(3,4-dichlorophenylthio) - bicyclo[2.2.1]hept-2-yl-exo-carbonitrile _____ Do.
- 5(6) - chloro - 6(5) - [4 - (methylthio) - phenylthio] - hept - 2 - yl-exo-carbonitrile _____ Do.
- 5(6) - chloro - 6(5) - (4 - chlorophenylthio) - bicyclo[2.2.1]hept-2-yl-exo-carbonitrile _____ Do.

What is claimed is:

1. Exo-cyanobicyclo[2.2.1]heptanes of the formula:

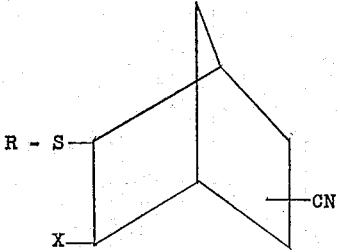

wherein R is alkyl, chloroalkyl, bromoalkyl, arylalkyl, chloroaryl, alkoxyaryl, alkylthioaryl, arylthioaryl, chloroarylthioaryl, alkoxycarbonylalkyl, nitroaryl, chloronitroaryl, or alkaryl and wherein R contains not more than 18 carbon atoms; and X is chlorine or bromine.

2. Exo-cyanobicyclo[2.2.1]heptanes of the formula

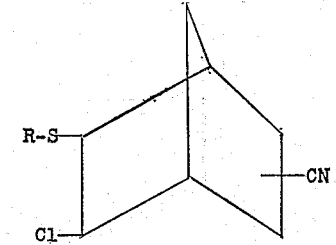

wherein R is halophenyl.

3. Exo-cyanobicyclo[2.2.1]heptanes of the formula

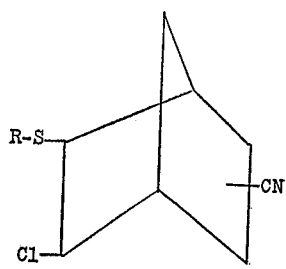

wherein R is nitrophenyl.

4. Exo-cyanobicyclo[2.2.1]heptanes of the formula

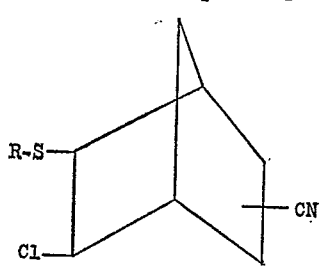

wherein R is alkylphenyl.

5. Exo-cyanobicyclo[2.2.1]heptanes of the formula

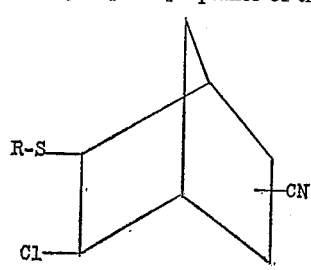

wherein R is alkyl.

6. Exo-cyanobicyclo[2.2.1]heptanes of the formula

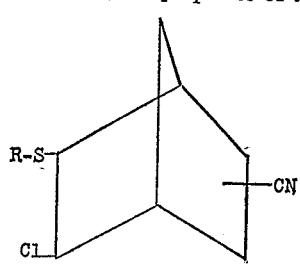

wherein R is haloalkyl.

7. 5(6) - chloro - 6(5) - butylthiobicyclo[2.2.1]hept-2-yl-exo-carbonitrile.

8. 5(6) - chloro - 6(5) - (1,2,2,2-tetrachloroethylthio)-bicyclo[2.2.1]hept-2-yl-exo-carbonitrile.

9. 5(6) - chloro - 6(5) - (4 - chlorobenzylthio)bicyclo[2.2.1]hept-2-yl-exo-carbonitrile.

10. 5(6) - chloro - 6(5) - (4 - bromophenylthio)bicyclo[2.2.1]hept-2-yl-exo-carbonitrile.

11. 5(6) - chloro - 6(5) - (4 - chlorophenylthio)bicyclo[2.2.1]hept-2-yl-exo-carbonitrile.

12. A method for preparing exo-cyanobicyclo[2.2.1]heptanes of the formula

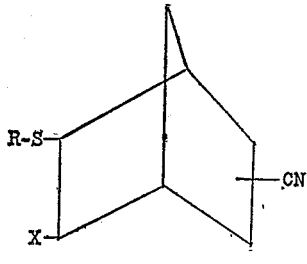

which comprises reacting a sulfenyl halide of the formula

RSX with an exo-cyanobicyclo[2.2.1]heptane of the formula

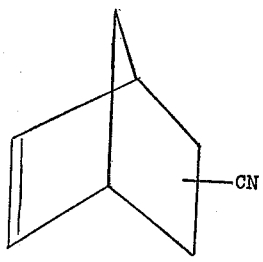

wherein R is alkyl, chloroalkyl, bromoalkyl, arylalkyl, chloroaryl, alkoxyaryl, alkylthioaryl, arylthioaryl, chloroarylthioaryl, alkoxycarbonylalkyl, nitroaryl, chloronitroaryl, or alkaryl and wherein R contains not more than 18 carbon atoms; and X is chlorine or bromine.

No references cited.

CHARLES B. PARKER, *Primary Examiner.*

JOSEPH P. BRUST, *Examiner.*